(12) United States Patent
Xu et al.

(10) Patent No.: US 8,719,888 B1
(45) Date of Patent: May 6, 2014

(54) VIDEO ENCODING AND SERVING ARCHITECTURE

(71) Applicants: Yaowu Xu, Santa Clara, CA (US); James Bankoski, Los Gatos, CA (US); Paul Gordon Wilkins, Mountain View, CA (US)

(72) Inventors: Yaowu Xu, Santa Clara, CA (US); James Bankoski, Los Gatos, CA (US); Paul Gordon Wilkins, Mountain View, CA (US)

(73) Assignee: Google Inc., Mountain View, CA (US)

( * ) Notice: Subject to any disclaimer, the term of this patent is extended or adjusted under 35 U.S.C. 154(b) by 11 days.

(21) Appl. No.: 13/652,900

(22) Filed: Oct. 16, 2012

(51) Int. Cl.
*H04N 7/173* (2011.01)
*G06F 15/16* (2006.01)

(52) U.S. Cl.
USPC ............... 725/114; 725/86; 725/87; 725/93; 725/115; 725/116; 709/217; 709/231

(58) Field of Classification Search
None
See application file for complete search history.

(56) References Cited

U.S. PATENT DOCUMENTS

| 7,739,714 | B2* | 6/2010 | Guedalia | 725/90 |
| 8,087,056 | B2* | 12/2011 | Ryu | 725/93 |
| 8,161,159 | B1 | 4/2012 | Shetty et la. | |
| 8,566,886 | B2* | 10/2013 | Scholl | 725/93 |
| 2002/0152318 | A1* | 10/2002 | Menon et al. | 709/231 |
| 2009/0144417 | A1* | 6/2009 | Kisel et al. | 709/224 |
| 2012/0084821 | A1 | 4/2012 | Rogers | |

OTHER PUBLICATIONS

Neogi, A., et al., Compression Techniques for Active Video Content; State University of New York at Stony Brook; Computer Science Department; pp. 1-11.

* cited by examiner

*Primary Examiner* — Oschta Montoya
(74) *Attorney, Agent, or Firm* — Young Basile Hanlon & MacFarlane P.C.

(57) ABSTRACT

Techniques for delivering content, such as videos, over a network are described. A core server and an edge server are provided. The core server has local storage. The edge server has local storage. A set of video frames is partitioned into a first group and a second group. Video frames in the first group are encoded into a scalable encoded stream. The scalable encoded stream is sent to the local storage at the edge server. The second group of video frames is encoded into a set of supplemental encoded streams using the scalable encoded stream as a reference. The supplemental encoded streams are encoded such that the bit rate and/or resolution of any two supplemental encoded streams is different. The set of supplemental encoded streams is stored in the storage of the core server.

11 Claims, 7 Drawing Sheets

101

○ Video Sharing

File  Edit  View  History  Bookmarks  Tools  Help http://www.videosharing.com  Search Video Share Yourself Sign Up | My Account | History | Help | Log in | Site
Videos | Categories | Channels | Community   @Upload ducati  Search  Search Search results for "ducati"  103  1-20 of about 6,000

Sort by: Relevance | Date Added | View Count | Rating  Display:

★★★★☆

La storia della Ducati Superbike
From early Pantah F1 to 1068, 25
years of Ducati superbike. Forza
Daemo, Forza Ducati...Ducati
Superbike 999 888 915 748 995 998
F1 Desmoquatiro
Tags: Ducati Superbike 999 888 915
748 995 998 F1 Desmoquatiro Deemo
Time: 02:38

From: ElGladiatour
Views: 81,263
Added: 11 Months ago
More: Autos & Vehicle

105

★★★☆☆

Lamborghini Gallardo vs. Ducati 999

Fifth Geer clip featuring Lamborghini
Gallardo vs. Ducati 999 ., Racing
supercar superbike Fifth Gear
Tags: racing supercar superbike fifth
gear
Time: 03:03

From: Jay302
Views: 285,614
Added: 1 year ago
More: Howto & Style

107

★★★★☆

Mazda RX7 Tuned Vs Ducati 748
MAZDA ITS GANSTA .... Mazda RX7
Tags: Mazda Rx7
Time: 03:33

From: MRGEYEZ
Views: 215,493
Added: 1 year ago
More: Sports

★★★☆☆

Ducati 848 Elcma 2007
Ducati 848 Elerra 2007 by Motoblogit..

From: blogvideo

Done

Figure 1

VIDEO ENCODING AND SERVING ARCHITECTURE

BACKGROUND

Video hosting refers to a service where users distribute video clips, typically found on the Internet. Video-hosting websites allow users to discover videos available over the Internet. A user discovers videos of interest by submitting a search query to the video-hosting website or browsing in different categories or channels of the video-searching website. Using either approach, the video host presents the user with a list of videos from which he or she can choose.

Once a user finds a video of interest and selects a link to the video, the user loads a webpage associated with the video and views the video and/or details of the video. The video-hosting website allows a user to search and view videos contained within the video-hosting website or videos located on or sourced from other websites.

SUMMARY

Described herein are techniques for delivering content, for example, videos, over a network. A core server and an edge server are provided. The core server has local storage. The edge server has local storage. A set of video frames is partitioned into a first group of frames and a second group of frames. Video frames in the first group are encoded into a scalable encoded stream. The scalable encoded stream is sent to the local storage at the edge server. Video frames in the second group are encoded into a set of supplemental encoded streams using the scalable encoded stream as a reference. The supplemental encoded streams are encoded such that any two supplemental encoded streams may have different bit rates and different resolutions. The set of supplemental encoded streams is stored in the storage of the core server.

This Summary introduces concepts in a simplified form that are further described below in the Detailed Description. This Summary is not intended to identify key features or essential features of the claimed subject matter, nor is this Summary intended to be used as an aid in determining the scope of the claimed subject matter. The term 'techniques', for instance, refers to device(s), system(s), method(s) and/or computer-readable instructions as permitted by the context above and throughout the document.

BRIEF DESCRIPTION OF THE DRAWINGS

The detailed description refers to the following accompanying drawings:

FIG. 1 displays a screen shot illustrating an example of a user interface displaying videos associated with a user search query in accordance with one or more implementations described herein;

DETAILED DESCRIPTION

Described herein are techniques for delivering content, such as videos, over a network including a core server and an edge server. Both the core server and edge server have local storage. A set of video frames is partitioned into a first group and a second group. The first group of video frames is encoded into a scalable encoded stream which is sent to the local storage at the edge server, increasing the efficiency of the local storage at the edge server. The second group of video frames is encoded into a set of supplement encoded streams using the scalable encoded stream as a reference. The supplemental encoded streams are encoded such that the bit rates and/or resolutions of any two supplemental encoded streams are different. The supplemental encoded streams are stored in the storage of the core server, increasing the efficiency of core server bandwidth.

The brief overview following this introduction is provided for the reader's convenience and is not intended to limit the scope of the claims or the following sections.

Streaming services are popular services on the World Wide Web, providing streaming multi-media to end users on an on-demand basis. Video-hosting services as well as other content providers utilize a great deal of bandwidth.

By way of example, FIG. 1 displays an example user interface 101 illustrating a result page responsive to a user querying the keyword "Ducati" using the dialog box 103 to search for videos related to products sold by Ducati Motor Holding S.P.A., 3 Via Cavalieri Ducati, Bologna, Italy. For results of the keyword search, the user interface 101 lists appropriate videos retrieved from a video repository. Examples of appropriate videos include "La storia della Ducati Superbike" 105 and "Lamborghini Gallardo vs. Ducati 999" 107. After reviewing the result page, the user selects a target video from the result page to watch.

After selection of the target video, the user interface 101 transmits and presents the requested video and related video links to the user. In addition, icon or thumbnail views of related videos accompany the links, along with associated metadata such as, for example, title, author, tags, and rating. For example, if a user provides the user interface 101 with a request for a specific video with the title of "La storia della Ducati Superbike", the user interface 101 presents the selected target video to the user along with links to related videos as further described in FIG. 2.

Figure 2:
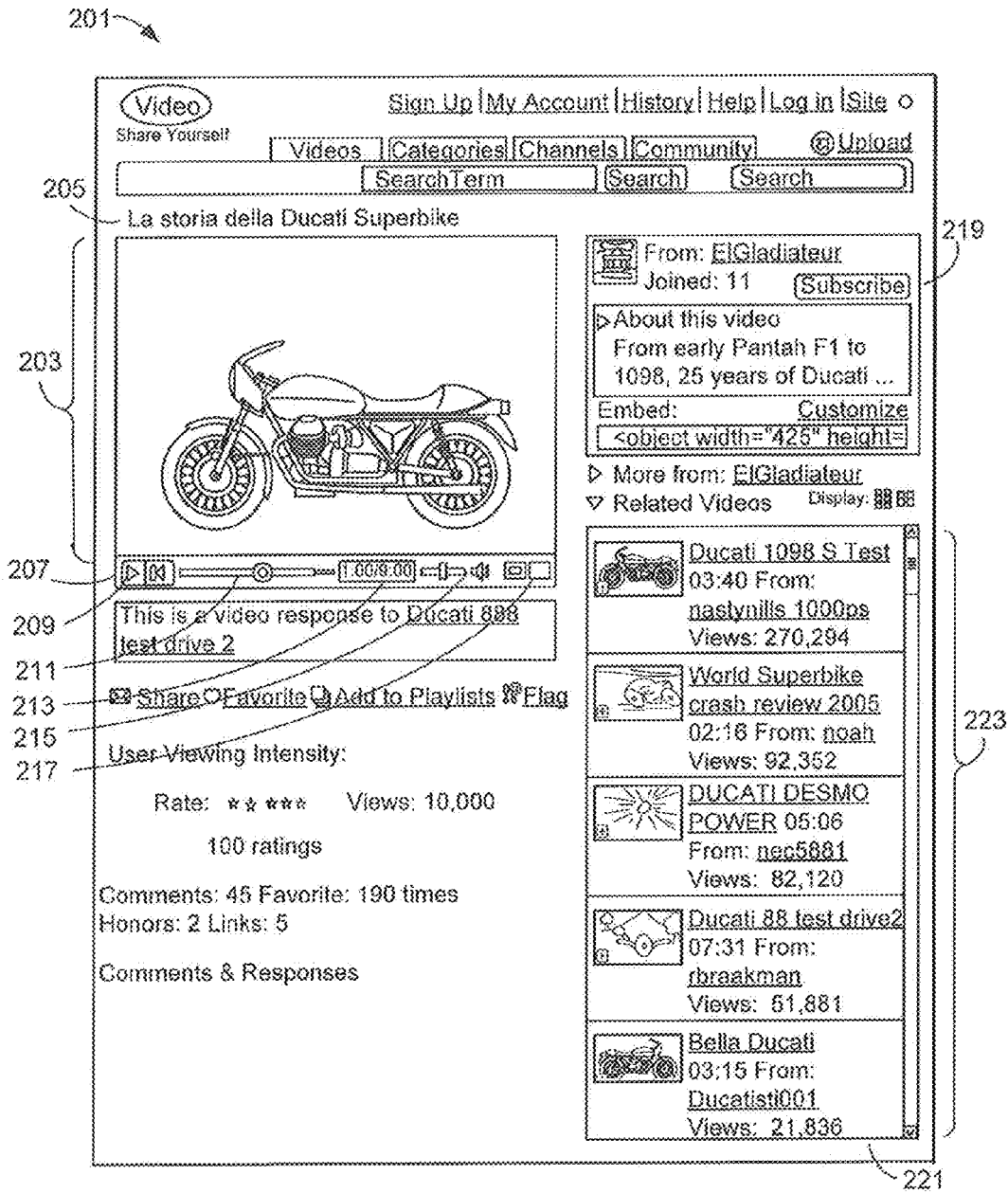
FIG. 2 displays a screen shot illustrating an example of a user interface displaying the target video in accordance with one or more implementations described herein.

FIG. 2 displays an example webpage 201 playing the video 203 with the title 205 "La storia della Ducati Superbike," The webpage 201 contains controls 207 that allow a user to control how and when to play the video 203. Such controls 207 can include, for example, a play/pause button 209, a progress bar 211 that allows a user to skip ahead or repeat, a timer 213, a volume control 215, and a screen size adjustment 217. A video-information box 219 contains information about the video 203. A related-videos box 221 contains links to videos 223 that a video-hosting service has determined are related to video 203. The video-serving module retrieves the related videos 223 from a video repository for user presentation. If a user selects a link of a related video 223, the video-hosting service plays the related video 223.

Currently, video-hosting services deliver multi-media content over a content delivery network (CDN). A CDN typically comprises core servers and edge servers. A core server resides at a node on a backbone of a CDN. An edge server is located at a node topologically (and perhaps physically) close to its end users. Such a network location is usually referred to as a network edge.

Unless the context indicates otherwise, statements regarding relative distance or ordering of nodes (e.g., core severs, edge servers) on a CDN are focused primarily upon a topological relationship rather than a physical relationship. For example, a statement that an edge server is close to an end user is primarily concerned with topological closeness rather than physical closeness.

It is relatively costly to improve connection bandwidth among core servers and between core servers and edge servers. This is because of the large network infrastructure investment required. However, the cost of connection bandwidth between an edge server and its end users is relatively low. In practice, connection between an edge server and its end users at the network edge has relatively high bandwidth with low response time. By caching popular content on the edge servers, a large number of end users can be serviced without posing great bandwidth pressure on network backbones.

A cache transparently stores data so that future requests for that data can be served faster. The data stored within a cache might be values that have been computed earlier or duplicates of original values that are stored elsewhere. If requested data is contained in the cache, this request can be served by simply reading the cache, which is comparatively faster. Otherwise, the data has to be recomputed or fetched from its original storage location, which is comparatively slower. Hence, the greater the number of requests that can be served from the cache, the faster overall system performance. The use of edge servers and caching allows a CDN to efficiently provide video content to end users.

As mentioned previously, video hosting is typically found on the Internet. The Internet connects a global network of computers. Network servers support hypertext capabilities that permit the Internet to link together websites. Hypertext is text displayed on a computer or other electronic devices with references (for example, hyperlinks) to other text. Users navigate the Internet through graphical-user interfaces (GUI). Uniform-resource locators (URLs) identify specific websites and web pages. URLs also identify the address of the website to be retrieved from a network server. The transfer control protocol/internet protocol (TCP/IP) transfers information.

The Internet typically uses a hypertext language referred to as the hypertext mark-up language (HTML). HTML permits content providers to place hyperlinks within web pages. These hyperlinks connect related content or data, which may be found on multiple Internet-host computers. HTML document links retrieve remote data by use of hypertext transfer protocol (HTTP). When a user clicks on a link in a web document, the link icon in the document contains the URL that the client application employs to initiate the session with the server storing the linked document. HTTP is a protocol used to support the information transfer.

Figure 3:
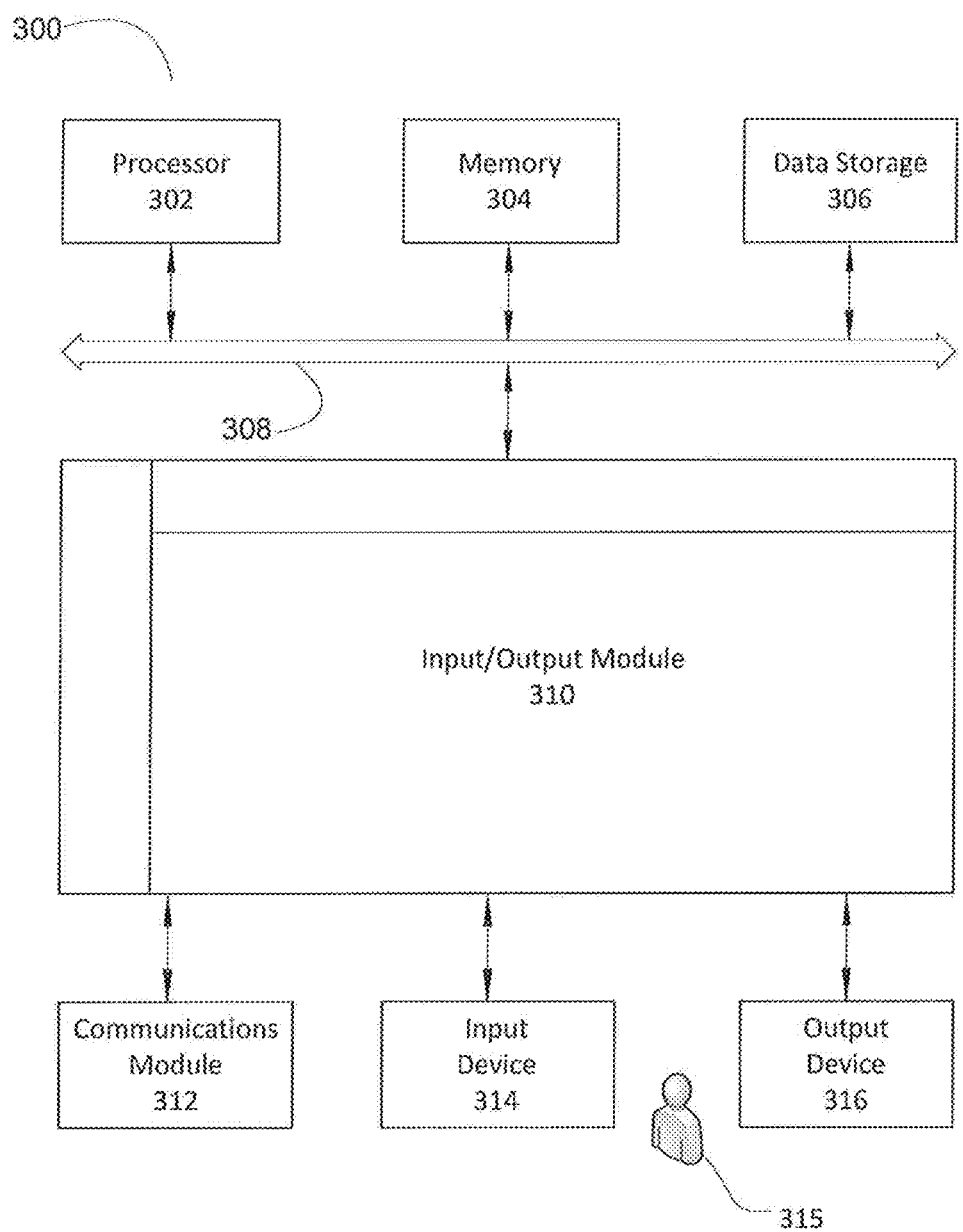
FIG. 3 displays a high-level block diagram of example computer architecture in which techniques for delivering content over a network can be employed in accordance with one or more implementations described herein.

FIG. 3 displays a high-level block diagram of example computer architecture in which techniques for delivering content over a network can be employed. The computer system 300 can include, in addition to hardware, computer-executable instructions stored in memory 304. A bus 308 couples the memory 304 for storing information and instructions executable by processor 302. Special purpose logic circuitry can supplement or incorporate the processor 302 and the memory 304.

The instructions may be stored in the memory 304 and implemented in one or more computer program products. Computer program products can be one or more modules of computer program instructions encoded on a computer readable medium for execution by, or to control the operation of, the computer system 300. Memory 304 may store temporary variable or other intermediate information during execution of instructions executable by the processor 302.

The computer system 300 further includes a data storage device 306 coupled to the bus 308. The data storage device 306 stores information and instructions. An input/output module 310 may couple computer system 300 to various devices. The input/output module 310 can be any input/output module. Examples of input/output modules 310 include data ports such as universal serial bus (USB) ports. The input/output module 310 connects to a communications module 312. Examples of communications modules 312 include networking interface cards, such as Ethernet cards and modems.

The input/output module 310 connects to a number of devices, such as an input device 314 and/or an output device 316. Examples of input devices 314 include a keyboard and a pointing device such as, for example, a mouse, by which a user 315 can provide input to the computer system 300. Examples of output devices 316 include display devices such as, for example, a liquid crystal display (LCD) monitor for displaying information to the user 315.

According to one aspect, the techniques described herein can be implemented using the computer system 300 in response to processor 302 executing one or more sequences of one or more instructions contained in memory 304. Another machine-readable medium, such as data storage device 306, may read such instructions into memory 304. Execution of the sequences of instructions contained in memory 304 causes processor 302 to perform the process steps described herein.

Computing system 300 can include clients and servers. A client and server are generally remote from each other and typically interact through a communication network. The relationship of client and server arises by virtue of computer programs running on the respective computers and having a client-server relationship to each other.

Figure 4:
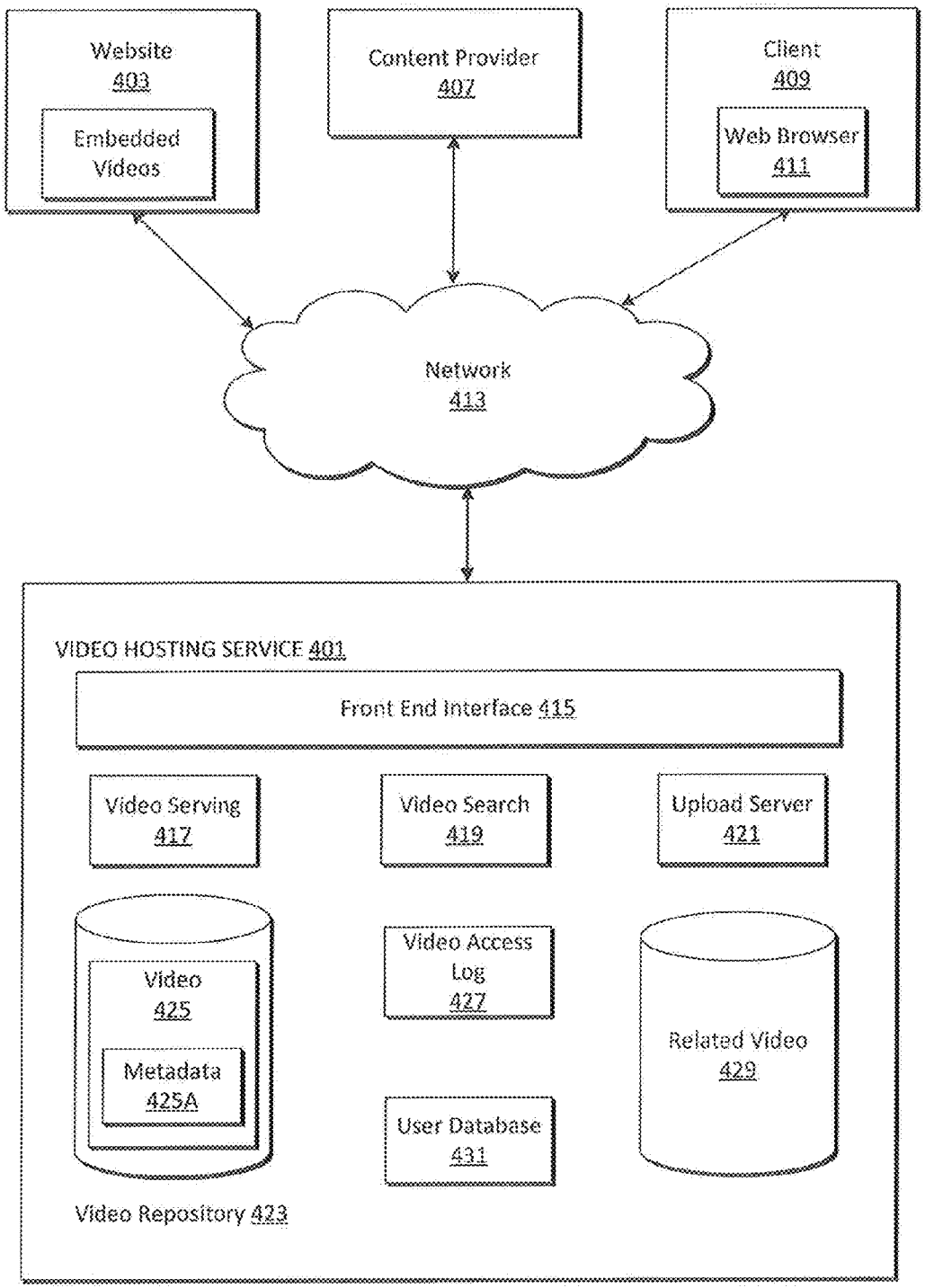
FIG. 4 displays a high-level block diagram of an example media-hosting service system architecture in which techniques for delivering content over a network can be employed in accordance with one or more implementations described herein.

FIG. 4 displays a high-level block diagram of an example video-hosting service 401. Generally, the video-hosting service 401 represents any system that allows users to access video content via searching and/or browsing interfaces. In one implementation, the video-hosting service 401 makes available additional types of media.

The video-hosting service 401 represents a system that stores and provides videos to users. The video-hosting service 401 communicates with a number of content providers 407 and clients 409 via a network 413. The configuration and management of large networks includes storage devices and computers that are communicatively coupled to dissimilar computers and storage devices. The network 413 is typically the Internet, but may be any network.

The client 409 is a computing device that executes client software such as, for example, a web browser 411 to load a website. The client 409 connects to the video-hosting service 401 via the network 413 to display videos. The client 409 can include a variety of different computing devices. Examples of computing devices include digital assistants, personal digital assistants, cellular phones, mobile phones, smart phones, laptop computers, tablet computers, and the like.

In some implementations, the client 409 includes an embedded-video player such as, for example, the FLASH® video player available from Adobe Systems Incorporated, 345 Park Avenue, San Jose, Calif. 95110. Of course, the client 409 can include other players adapted for the video file formats used in the video-hosting service 401.

The videos are sourced from user uploads, searches or crawls of other websites or databases of videos, and combinations thereof. The video-hosting service 401 obtains data from various external websites 403. The websites 403 include one or more web pages accessible to the video-hosting service 401 via the network 413. The web pages include, for example, textual content such as HTML.

The content provider 407 performs various content-provider functions. Examples of content-provider functions include uploading a video to the video-hosting service 401, editing a video stored by the video-hosting service 401, editing metadata information about a video, editing content-provider preferences associated with a video, and the like. For the sake of clarity, FIG. 4 depicts only one instance of website 403 and content provider 407, though there could be any number of each. In addition, while only one client 409 is shown, the video-hosting service 401 can support and communicate with very large numbers of clients at any time.

The video-hosting service 401 includes a front-end interface 415, a video-serving module 417, a video-search module 419, an upload server 421, a video repository 423, a video access log 427, a related-videos database 429, and a user database 431. Other conventional features such as, for example, firewalls, load balancers, authentication servers, application servers, failover servers, site-management tools, and so forth are not shown so as to illustrate more clearly the features of the system.

The front-end interface 415 interfaces between the client 409 and the various components of the video-hosting service 401. The upload server 421 receives video content from a content provider 407. The video repository 423 contains a set of videos 425 submitted by content providers 407. The video repository 423 contains any number of videos 425 such as, for example, tens of thousands or hundreds of millions. The video repository 423 can be implemented using a database or file system, with indexing system for indexing and retrieving videos 425. A unique video identifier distinguishes each video from other videos, such as a textual name (for example, the string "a91qrx8"), an integer or any other way of uniquely naming a video.

In addition to audiovisual content, the videos 425 include associated metadata 425A. Examples of metadata 425A include textual metadata such as a title, description, and/or tags provided by a content provider 407 who uploaded the video or metadata obtained by an analysis of a video done by the video-hosting service 401.

Using the video-search module 419, clients 409 search for videos 425 from the video-hosting service 401 using keywords, browse various categories or channels, review play lists from other users or the system administrator (such as collections of videos forming channels), view videos 425 associated with particular user groups (such as communities), and the like. The video-search module 419 locates appropriate videos 425 in the video repository 423 to return to the client 409. The video-serving module 417 provides video data from the video repository 423 to the client 409. The related-videos database 429 contains related videos for a given video.

Various containers or wrappers package the videos 425. A container is a meta-file format whose specification describes how different data elements and metadata coexist in a computer file. Examples of the meta-file format include audio video interleave or interleaved (AVI) multimedia container standard specified available from Microsoft Corporation, One Microsoft Way, Redmond, Wash. 98052; MP4 multimedia-container standard based on the International Organization for Standardization (ISO) base-media-file format defined in MPEG-4 Part 12 and JPEG-2000 Part 12; QuickTime file format (QTFF) (.mov) developed by Apple Inc., 1 Infinite Loop, Cupertino, Calif. 95014; and the like.

Figure 5:
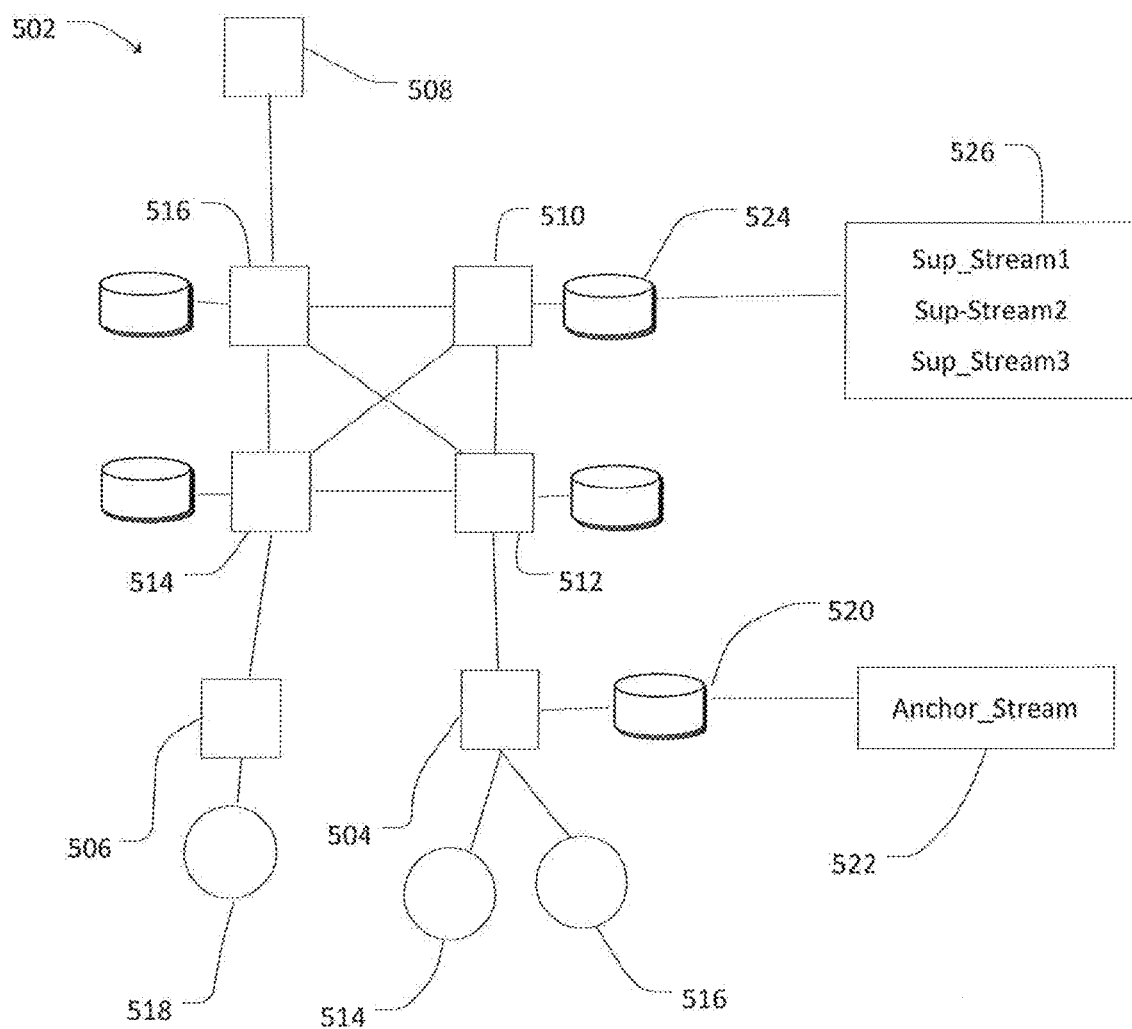
FIG. 5 displays a high-level block diagram of an example content delivery network in which techniques for delivering content over a network can be employed in accordance with one or more implementations described herein.

As previously introduced, techniques for delivering content, such as videos, over a network are described. FIG. 5 shows a high-level block diagram of an example CDN in a simplified illustration of an example implementation. A core network 502 is provided. The core network 502 may, for example, comprise a network backbone. The core network 502 includes edge servers 504, 506, 508 and core servers 510, 512, 514, 516.

The edge servers 504, 506 are associated with various end users 514, 516, 518. For example, edge server 504 provides content to end users 514, 516 only, whereas edge server 506 provides content to end user 518 only. An edge server is topologically close to its associated end users, perhaps residing on the same network. The core servers and end users, for the most part, do not reside on the same network.

A video clip is partitioned into a first group of video frames and a second group of video frames. The first group of video frames is encoded into an "anchor" stream, a scalable encoded stream as described below. The second group of video frames is encoded into a set of supplemental encoded streams. The anchor stream comprises seek points. Seek points are video frames that an end user views when fast forwarding through a video clip. Each supplemental encoded stream comprises video frames of the video clip that are not in the anchor stream.

The anchor stream is encoded to comprise scalable and independently decodable (key) frames. A video stream is scalable when parts of the stream can be removed such that the resulting subset stream is a valid stream for some target decoder. The media content of the subset stream can be reconstructed at a quality that is less than that of the original stream, but is high in view of the lower quantity of data in the subset bit stream. A key frame defines a video frame that is independently decodeable without reference to other video frames. An anchor stream comprised of scalable key frames allows a single stream to serve videos at multiple resolutions and bit-rates.

An anchor stream can be served and decoded at different resolutions and different bit rates. A decoder decodes the encoded anchor stream at a bit-rate chosen from some fixed set of bit-rates, where the quality and/or resolution of the decoded stream increase as the bit-rate increases. A decoder for a scalable encoded stream is somewhat more complex than simpler decoders designed for non-scalable streams; the resulting quality of the decoded stream at some bit rate may be somewhat less than that obtained from a non-scalable video stream at the same bit rate. However, the use of scalable encoding allows the same video file to serve as a video source for both low bit-rate and high-bit rate end users.

The encoded scalable anchor stream is stored in storage local to the edge servers in a cache. Local storage is storage that is topologically close (from a network point of view) to an edge server in the sense that the edge server addresses local storage by way of a bus or switch, or where the edge server and local storage reside on the same network. Local storage may be some physical distance away from the edge server machine.

By caching a scalable encoded anchor stream on storage local to the edge servers, a large number of end users at varying bit-rates may quickly access seek points in a video clip with low latency. For example, in FIG. 5, storage 520 is local to the edge server labeled 504. Storage 520 contains a file containing the video clip pictorially represented by the box labeled 522 with the video clip named "Anchor_Stream".

In one implementation, the second group of video frames of a video clip is encoded into a set of supplemental encoded streams. This set of supplemental encoded streams contains more than one supplemental encoded stream. The encoding is not scalable, but rather each supplemental encoded stream is for some fixed bit rate and resolution. The supplemental encoded streams can then be stored on storage local to the core server.

For example, storage 524 is local to core server 510. The set of supplemental encoded streams 526 are stored on storage 524, with the files named "Sup_Stream1," "Sup_Stream2," and "Sup_Stream3." Each file contains a supplemental encoded stream at some fixed bit-rate, where Sup_Stream1 has bit-rate $R_1$, Sup_Stream2 has bit-rate $R_2$, and Sup_Stream3 has bit-rate $R_3$, with $R_1 < R_2 R_3$.

Full decoding of a video clip requires both the encoded anchor stream, or scalable encoded stream, and a supplemental encoded stream. Decoding the encoded anchor stream does not require a supplemental encoded stream, but decoding a supplemental encoded stream does require the encoded anchor stream. Decoding the supplemental encoded streams makes use of the decoded anchor stream as a reference.

A number of well-known video codecs may be used to encode a video stream into an encoded anchor stream and supplemental encoded streams, and to decode them back into a decoded video stream. For example, anchor streams may comprise scalable IDR-frames and a supplemental stream may comprise P-frames using the IDR-frames as a reference.

By caching the encoded anchor stream at the edge server of the CDN, the video frames of a video clip used for seeking are readily available with low latency to a large number of end users. If an end user wishes to watch the entire video clip, or to see some parts in their entirety, then that end user may notify the video content delivery service that a supplemental encoded stream at some prescribed bit-rate is desired. Most often, the edge server closest to the end user provides the encoded anchor stream to the end user. For a very popular video clip, some or all of the supplemental encoded streams for the video clip may be cached on the edge servers.

Because edge servers are close to end users, encoded anchor streams stored near edge servers provide viewers a rich experience for video content, particularly when viewer consumption of such video content includes activities such as browsing and seeking scenes. With anchor streams encoded in scalable fashion, a single anchor stream can serve video at multiple resolutions and bit-rates. Such an approach can make more efficient use of edge server storage space and core network bandwidth than current CDN architectures, thereby leading to lower storage cost, lower core network infrastructure cost, and lower bandwidth cost.

Slightly more decoding complexity is incurred at the end user for an encoded anchor stream when compared to a non-scalable encoded video stream. But this decoding complexity is only slightly more than for the case of decoding non-scalable video streams because, for typical video playback, seeking frames constitute a relatively small portion of video frames in most video clips.

Figure 6:
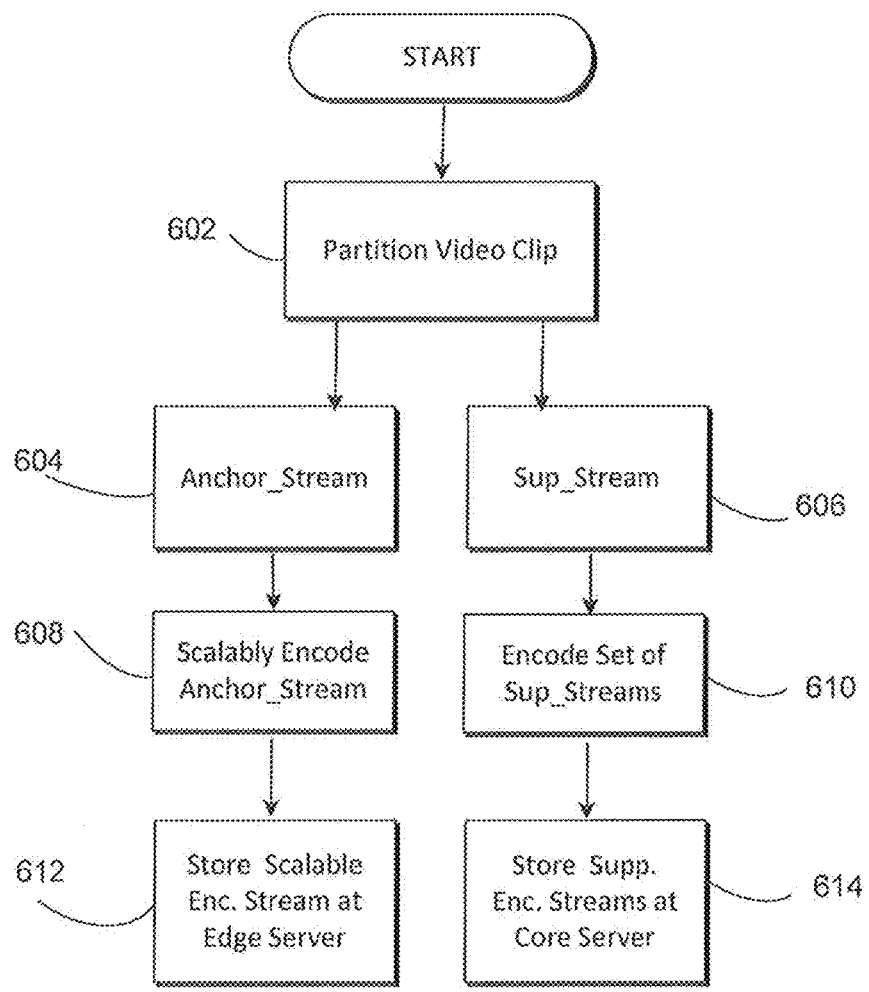
FIG. 6 displays an example flow chart for encoding a video clip in which techniques for delivering content over a network can be employed in accordance with one or more implementations described herein.
Figure 7:
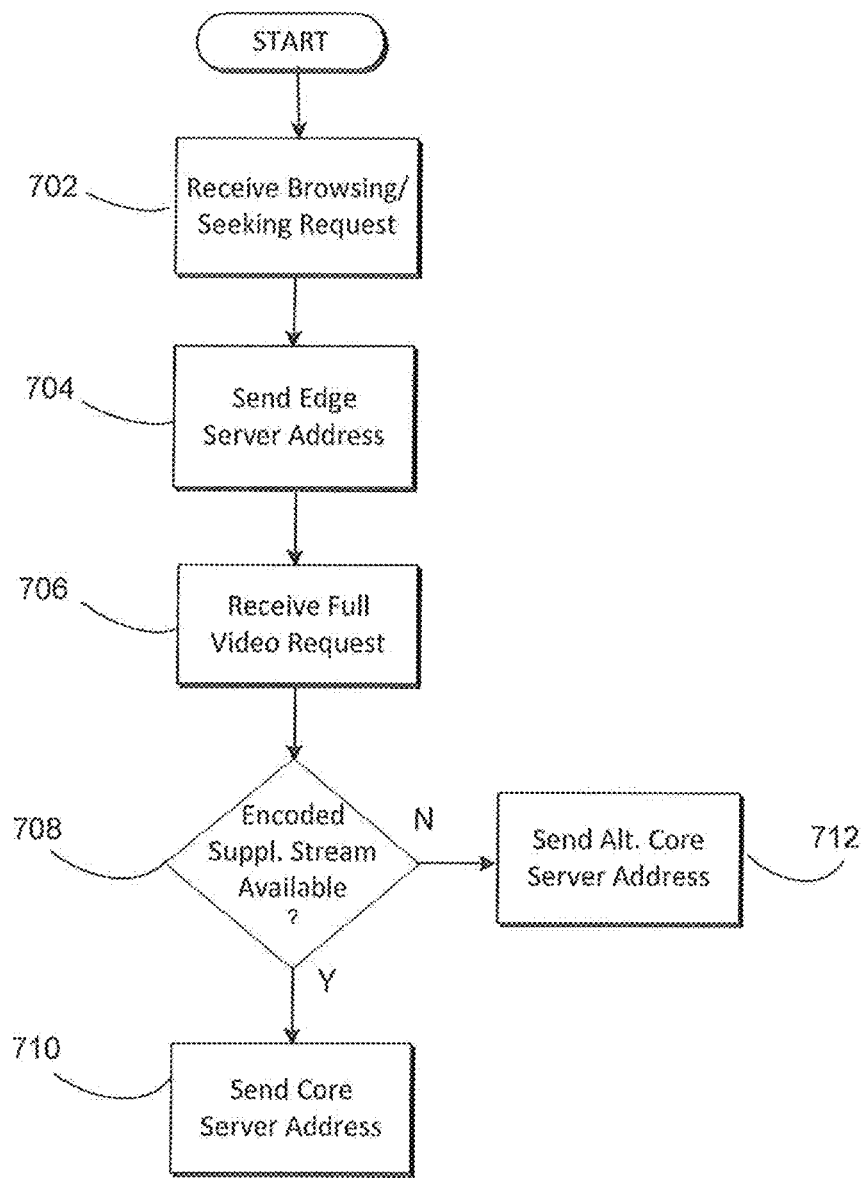
FIG. 7 displays an example flow chart for replying to requests from an end user in which techniques for delivering content over a network can be employed in accordance with one or more implementations described herein.

FIGS. 6 and 7 are flow charts of example processes of delivering content over a network. Other implementations can perform the steps of FIGS. 6 and 7 in different orders. In addition, other implementations can include different and/or additional steps than the steps described herein.

FIG. 6 illustrates an implementation for encoding a video clip. At step (602) a video clip, or set of video frames, is partitioned into a first group of frames referred to as the anchor stream (604), and a second group of frames referred to as the supplemental stream (606). At step (608), the anchor stream (604) is scalably encoded to different bit-rates and resolutions into a scalable encoded stream. Higher bit-rates can provide a higher resolution to the end user.

At step (610), the supplemental stream is encoded into a set of supplemental encoded streams. Each supplemental encoded stream is encoded to a bit-rate different from that of the other supplemental encoded streams. At step (612), the scalable encoded stream is stored at various edge servers within the CDN. At step (614), the set of supplemental encoded streams is stored at one or more core servers within the CDN.

FIG. 7 illustrates an implementation for replying to requests from an end user. In step (702), the video streamer receives a request from an end user for video browsing or seeking. In response to this request, in step (704), the video streamer replies to the end user with a network address of an available edge server closest to the end user that has an available copy of the scalable encoded stream associated with the desired video clip.

In step (706), the video streamer receives a request for the full video at some rate R. In step (708), the video streamer determines if a copy of a supplemental encoded stream at rate R associated with the desired video is available. If such a supplemental encoded stream is available, then at step (710) the video streamer replies with the network address of the closest available core server that has an available copy of a supplemental encoded stream at rate R associated with the desired video. If such a supplemental encoded stream is not available, then at step (712) the video streamer replies with the network address of the closest available core server that has an available copy of a supplemental encoded stream at a rate less than but closest in value to the rate R, i.e., an alternate supplemental encoded stream.

For the purposes of convenience, the uploaded media is described in a 'video' or 'videos' implementation; however, limitations on the types of uploaded media are not intended. Thus, the operations described for summarizing media apply to any type of media, not only videos. Examples of media include music, podcasts, audio books, multimedia presentations, and so forth.

The implementations described herein are not inherently related to any particular hardware or other apparatus. The operations of the video-hosting service can be controlled through either hardware or through computer programs installed in computer storage and executed by the processors of servers. One or more processors in a multi-processing arrangement also may be employed to execute the sequences of instructions.

When embodied as hardware, the hardware may be specially constructed for the required purposes or may include a general-purpose computer selectively activated or reconfigured by a computer program stored on a computer-readable medium. In addition, the implementation described herein is not limited to any particular programming language.

The video-hosting service may be implemented using a single computer or a network of computers, including cloud-based computing. The computers can be server-class computers including one or more high-performance central processing units (CPUs), memory such as, for example, one gigabyte (1 GB) or more of main memory, as well as 500 GB to two terabyte (2 TB) of computer-readable persistent storage, network interface, peripheral interfaces, and other well-known components.

The computers can run a operating system. Various types of operating systems and computers can be used, and it is expected that more powerful computers developed in the future can be configured in accordance with the teachings herein.

In addition to the Internet, the network may be any network. Examples of networks include local area networks (LAN), metropolitan area networks (MAN), campus area networks (CAN), wide area networks (WAN), mobile wired or wireless networks, private networks, virtual private networks, and the like. In addition, all or some of the links can be encrypted using conventional encryption technologies. Examples of encryption technologies include the secure-sockets layer (SSL), secure http, virtual private networks (VPNS), and the like. Other implementations utilize custom and/or dedicated data communications technologies instead of, or in addition to, the communications technologies described above.

The terms client and content provider as used herein may refer to software providing client and content-providing functionality, to hardware devices on which the software executes, or to the entities operating the software and/or hardware. The term 'website' represents any computer system adapted to serve content using any working protocols, and is not limited to content uploaded or downloaded via the Internet or HTTP.

The term computer-readable media includes computer-storage media. Examples include magnetic-storage devices such as hard disks, floppy disks, and magnetic tape; optical disks such as compact disks (CD) and digital-versatile disks (DVD); magnetic-storage devices such as digital tapes, floppy disks, and magneto-resistive-random-access memory (MRAM); non-volatile memory such as read-only memory (ROM), erasable-programmable-read-only memory (EPROMs), and electrically-erasable-programmable-read-only memory (EEPROMs); volatile memory such as random-access memory (RAM), dynamic random access memory (DRAM), ferroelectric-random-access memory (FeRAM), and static-random-access memory (SRAM); or any other type of media suitable for storing electronic instructions.

Furthermore, at times arrangements of operations have been referred to as modules or by functional names, without loss of generality. The term 'module' refers to computational logic for providing the specified functionality. The division of functionality between components, the naming of modules, components, attributes, data structures, or any other programming or structural aspect is merely exemplary, and not mandatory or significant. In addition, other implementations may lack modules and/or distribute the described functionality among modules in a different manner. Functions performed by a component may instead be performed by multiple components, and functions performed by multiple components may instead be performed by a single component. In general, functions described in one implementation as performed on the server side can be performed on the client side in other implementations and vice versa, if appropriate.

Although the subject matter has been described with a specific implementation, other alternatives, modifications, and variations will be apparent to those skilled in the art. Accordingly, the disclosure is intended to be illustrative, but not limiting, and all such alternatives, modifications, and variations are within the spirit and scope of the following claims.

What is claimed is:

1. A method implemented by one or more computing devices configured to deliver content over a network, the network comprising a core server and an edge server, the method comprising:
   partitioning a set of video frames into a first group and a second group;
   encoding the first group of video frames into a scalable encoded stream;
   storing the scalable encoded stream on storage local to the edge server;
   encoding the second group of video frames into a set of supplemental encoded streams using the scalable encoded stream as a reference, wherein each of the supplemental encoded streams is encoded to some bit rate such that the bit rate of any two supplemental encoded streams is different;
   storing the set of supplemental encoded streams on storage local to the core server;
   receiving a request from an end user to perform a first action on the set of video frames, the first action comprising video browsing;
   sending, to the end user, a network address of the edge server;
   receiving a request from the end user to perform a second action on the set of video frames, the second action comprising viewing the entire set of video frames; and
   sending, to the end user, a network address of the core server.

2. The method as set forth in claim 1, further comprising decoding the supplemental encoded stream making use of the scalable encoded stream as a reference.

3. The method as set forth in claim 1, further comprising decoding the scalable encoded stream without making use of a supplemental encoded stream.

4. One or more non-transitory computer-readable media storing processor-executable instructions that, when executed, cause one or more processors to perform operations that deliver content over a network, the operations comprising:
   partitioning a set of video frames into a first group and a second group;
   encoding the first group of video frames into a scalable encoded stream;
   storing the scalable encoded stream on storage local to an edge server;
   encoding the second group of video frames into a set of supplemental encoded streams using the scalable encoded stream as a reference, wherein each of the supplemental encoded streams is encoded to some bit rate such that the bit rate of any two supplemental encoded streams is different;
   storing the set of supplemental encoded streams on storage local to a core server;
   receiving a request from an end user to perform a first action on the set of video frames, the first action comprising video browsing;
   sending, to the end user, a network address of the edge server;
   receiving a request from the end user to perform a second action on the set of video frames, the second action comprising viewing the entire set of video frames; and
   sending, to the end user, a network address of the core server.

5. The one or more computer-readable media storing processor-executable instructions of claim 4, wherein the operations further comprise decoding of a video stream requiring both the scalable encoded stream and a supplemental encoded stream.

6. The one or more computer-readable media storing processor-executable instructions of claim 5, wherein the operations further comprise decoding the supplemental encoded streams making use of the decoded scalable encoded stream as a reference.

7. The one or more computer-readable media storing processor-executable instructions of claim 4, wherein the operations further comprise decoding the scalable encoded stream without making use of a supplemental encoded stream.

8. At least one computing device configured to deliver content over a network, the at least one computing device comprising:
   an interface configured to:
      receive a scalable encoded stream, the scalable encoded stream having been scalably encoded from a first group of frames resulting from a partition of a set of video frames into the first group and a second group; and
      receive the second group of video frames;
   local storage configured to store the scalable encoded stream, increasing the efficiency of storage local to an edge server; and
   an encoding service configured to:
      encode the second group of video frames into a set of supplemental encoded streams using the scalable encoded stream as a reference, the set of supplemental encoded streams encoded such that the bit rate of any two supplemental encoded streams is different; and
      send the supplemental encoded streams to storage local to a core server;
   wherein the interface is further configured to, in response to a request from an end user to browse the set of video frames, send to the end user a network address of the edge server; and
   wherein the interface is further configured to, in response to a request from an end user to view the entire set of video frames, send to the end user a network address of the core server.

9. At least one computing device configured to deliver content over a network, the at least one computing device comprising:
   an encoding service configured to:
      partition a set of video frames into a first group and a second group;
      encode video frames in the first group into a scalable encoded stream; and
      send the scalable encoded stream to an edge server;
   an interface configured to:
      receive from an edge server a set of supplemental encoded streams, the set of supplemental encoded streams having been encoded from the second group of video frames using the scalable encoded stream as a reference, and the supplemental encoded streams encoded such that the bit rate of any two supplemental encoded streams is different;
      send to an end user, in response to a request from the end user to browse the set of video frames, a network address of the edge server; and
      send to an end user, in response to a request from the end user to view the entire set of video frames, a network address of a core server; and
   local storage configured to store the set of supplemental encoded streams, increasing the efficiency of core server bandwidth.

10. The computing device of claim 9, wherein decoding of a supplemental encoded stream requires both the scalable encoded stream and the supplemental encoded stream.

11. The computing device of claim 9, wherein decoding of the scalable encoded stream does not require a supplemental encoded stream.

* * * * *